L. POETON & J. C. WELLS.
TEMPLE FOR OPHTHALMIC MOUNTINGS.
APPLICATION FILED JULY 20, 1914.
1,267,904. Patented May 28, 1918.
FIG. I
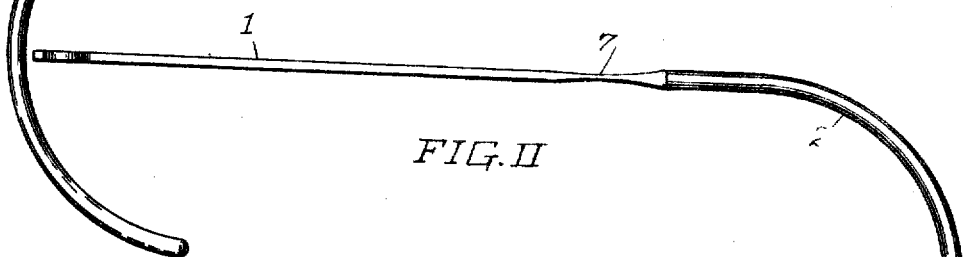
FIG. II
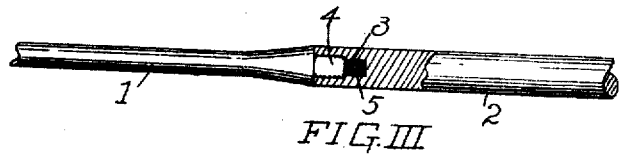
FIG. III
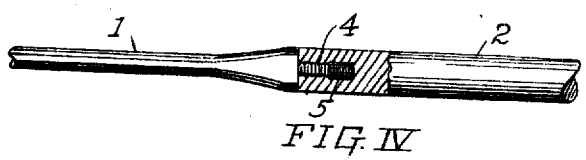
FIG. IV
WITNESSES:
Joseph L. Demers
Francis M. Shields
INVENTORS
JOEL C. WELLS & LAWRENCE POETON
BY
H. H. Stytt & H. K. Parsons
ATTORNEYS

UNITED STATES PATENT OFFICE.

LAWRENCE POETON AND JOEL C. WELLS, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

TEMPLE FOR OPHTHALMIC MOUNTINGS.

1,267,904. Specification of Letters Patent. Patented May 28, 1918.

Application filed July 20, 1914. Serial No. 851,912.

*To all whom it may concern:*

Be it known that we, LAWRENCE POETON and JOEL C. WELLS, citizens of the United States, residing at Southbridge, in the county of Worcester and State of Massachusetts, have invented certain new and useful Improvements in Temples for Ophthalmic Mountings, of which the following is a specification.

Our invention relates to improvements in temples and has for its leading object the provision of a novel, light, inconspicuous and extremely comfortable temple for use on ophthalmic mountings.

A further object of our invention is the provision of an improved form of temple which shall combine the strength and durability of the usual metallic construction with the lightness and comfort of the shell or composition type of ophthalmic temple.

Another object of our invention is the provision of an attractive and inconspicuous temple of this nature of very strong and durable construction, and which shall embody certain improved structural details, substantially as described.

Other objects and advantages of our improved temple for ophthalmic mountings should be readily apparent by reference to the following description taken in connection with the accompanying drawings, and it will be understood that we may make any modifications in the specific details of construction shown and described within the scope of the appended claims without departing from or exceeding the spirit of our invention.

Figure I represents a side elevation of one form of our improved temple.

Fig. II represents a similar view of a modified construction thereof.

Fig. III represents an enlarged fragmentary sectional view of our temple in a vertical plane.

Fig. IV represents a similar view thereof taken on a horizontal plane.

In the drawings, in which similar characters of reference are employed to denote corresponding parts throughout the several views, the numeral 1 designates the temple side, which is preferably formed from gold, gold filled or other suitable metallic material. Carried by said metallic portion 1 is the supplemental side and ear hook portion 2 formed from shell or suitable composition material, such as zyloware, for example.

In Figs. III and IV, we have illustrated one manner of attachment of the side and ear hook portions. In this form the side 1 is provided with the exteriorly threaded male member or tang 3, preferably considerably reduced in size, having a somewhat flattened portion 4. The member 2 is preferably formed with the socket or female portion as at 5 to receive the member 3 of the temple side, in use the parts being preferably screwed together to firmly unite the same, the ear hook then being somewhat heated and pressed around the projection 3 of the side, when the same will fit against the flattened portion 4 so tightly as to prevent any unscrewing or loosening movement of the parts without first re-heating of the member 2.

We have above referred to the possibility of breakage of the parts at the joint in the event of any strain. While this will not ordinarily occur it must be provided against, since some persons have the habit of trying to straighten and re-curl the ear hook when handling the mounting. To prevent the possibility of breakage at these points we, therefore, prefer to form the side with a particularly resilient portion as at 7. This may be accomplished either by forming the side with a cable portion at this point, as is illustrated in Fig. I, or by reducing or flattening the side at 7, as indicated at Fig. II. In either event additional resiliency is imparted to the temple side at the point 7 adjacent the joint so that any tendency to bend near the joint will cause the bending action to occur at the point 7 and thus eliminate to the greatest possible degree liability of breakage at the joint portion of the temple.

From the foregoing description the construction of our improved temple should be readily apparent, and it will be seen that we have provided a temple embodying the advantages of the metallic side, together with the comfort and clinging properties of the shell or composition ear hook, and that in addition we have so constructed the temple as to reduce to a minimum any liability of breakage adjacent the joint of the parts, and also have provided an extremely secure joint which will prevent accidental loosening of the parts.

We claim:

1. In a temple for spectacles, the combination with a solid ear piece of comparatively large diameter composed of celluloid or similar material and having a recess in its forward end, of a smaller lens attaching wire anchored in the recess of the ear piece by inserting it endwise therein, the recess being substantially the same size as the wire to be inserted therein, and the wire being formed with lateral projections embedded in the walls of the recess for anchoring the parts against relative twisting movement.

2. In a temple for spectacles, the combination with an ear piece composed of celluloid or similar material and formed with a recess in its forward end, of a smaller lens attaching wire anchored in the recess of the ear piece by inserting it endwise therein, the recess being substantially the same size as the wire to be inserted therein, and the wire being formed with shouldered portions embedded in the walls of the recess for anchoring the parts against longitudinal separating movement.

3. In a temple for spectacles, the combination with an ear piece of celluloid or similar material, having a recess in its forward end, of a smaller lens attaching wire anchored in the recess of the ear piece by inserting it endwise therein, the recess being substantially the same size as the wire to be inserted therein, and the wire being formed with projections embedded in the walls of the recess for anchoring the parts against relative movement.

4. In a temple for spectacles, the combination of a metallic side piece terminating in a flattened portion having a shoulder between the flattened portion and the side piece proper, and a non-metallic ear portion having an orifice to receive the end of the metal side, said ear portion being compressed over the flattened side portion to prevent withdrawal or twisting of the side portion.

In testimony whereof we affix our signatures in presence of two witnesses.

LAWRENCE POETON.
JOEL C. WELLS.

Witnesses:
J. EARL EATON,
J. N. PHILLIPS.